US008461256B2

(12) United States Patent
Conner et al.

(10) Patent No.: US 8,461,256 B2
(45) Date of Patent: Jun. 11, 2013

(54) LOW VOC AQUEOUS COMPOSITIONS OF ACRYLIC-URETHANE BLOCK COPOLYMERS

(75) Inventors: David Conner, Bethlehem, PA (US); Martin Heuts, Maria Hoop (NL)

(73) Assignee: Rohm and Haas Company, Philadelphia, PA (US)

(*) Notice: Subject to any disclaimer, the term of this patent is extended or adjusted under 35 U.S.C. 154(b) by 294 days.

(21) Appl. No.: 12/928,410

(22) Filed: Dec. 10, 2010

(65) Prior Publication Data
US 2011/0160395 A1 Jun. 30, 2011

Related U.S. Application Data

(60) Provisional application No. 61/284,900, filed on Dec. 28, 2009.

(51) Int. Cl.
| | |
|---|---|
| *C08F 8/30* | (2006.01) |
| *C08F 283/04* | (2006.01) |
| *C08G 18/08* | (2006.01) |
| *C08G 18/28* | (2006.01) |
| *C08J 3/00* | (2006.01) |
| *C08K 3/20* | (2006.01) |
| *C08L 75/00* | (2006.01) |

(52) U.S. Cl.
USPC .......... 524/591; 524/507; 524/589; 524/590; 524/839; 524/840; 525/123; 525/455

(58) Field of Classification Search
USPC .. 524/507, 589, 590, 591, 839, 840; 525/123, 525/455
See application file for complete search history.

(56) References Cited

U.S. PATENT DOCUMENTS

| | | |
|---|---|---|
| 4,318,833 A | 3/1982 | Guagliardo |
| 4,730,021 A | 3/1988 | Zom et al. |
| 5,147,925 A | 9/1992 | Pears et al. |
| 2004/0254292 A1 | 12/2004 | Williams |

FOREIGN PATENT DOCUMENTS

WO  WO 2009/028210 A1  3/2009

OTHER PUBLICATIONS

Fildes, F.J.T. et al., "Formation of Block Copolymers from Polyurethanes Containing Reactive Disulfides", Journal of Polymer Science: Part A-1, vol. 10, p. 151-161, (1972).
Brown, R. A. et al, "Comparing and Contrasing the Properties of Urethane/Acrylic Hybrids with Those of . . . ," Progress in Organic Coatings; vol. 52, pp. 73-84, (2005).

*Primary Examiner* — Patrick Niland
(74) *Attorney, Agent, or Firm* — Reid S. Willis (57) ABSTRACT

The present invention provides compositions that enable excellent hardness and UV resistance in coating applications, the compositions containing one or more acrylic-urethane block copolymer having as copolymerized units one or more acrylic monomer, which acrylic monomers are polymerized into a polyurethane backbone polymer. The compositions may be ambient curable. The invention also provides methods to obtain such acrylic-urethane block copolymers, which methods include the incorporation of an initiating species into the polyurethane backbone polymer, and subsequent polymerization of acrylic monomers in the presence of both the initiating species attached to the polyurethane polymer and a reducing agent.

7 Claims, 3 Drawing Sheets

LOW VOC AQUEOUS COMPOSITIONS OF ACRYLIC-URETHANE BLOCK COPOLYMERS

This application claims the benefit of priority under 35 U.S.C. §119(e) of U.S. Provisional Patent Application No. 61/284,900 filed on Dec. 28, 2009.

The present invention relates to aqueous compositions of acrylic-urethane block copolymers suitable for use in protective coatings. The invention also provides methods to obtain such acrylic-urethane block copolymers, which methods include the incorporation of an initiating species into the polyurethane backbone polymer, and subsequent polymerization of acrylic monomers in the presence of both the initiating species attached to the polyurethane polymer and a reducing agent.

Organic solvent-borne coatings compositions comprised primarily of polyurethane polymers are known to provide superior toughness, block resistance and resistance to soiling or water damage or solvent damage. However, no good routes exist to produce aqueous solutions of urethane polymers or even solvent-free aqueous dispersions of urethane polymers. Moreover, existing aqueous polyurethane dispersions (PUD's), which include significant levels of organic solvent, are more expensive than other polymer types suitable for use as waterborne coatings binders, such as acrylic emulsion polymers. Increasingly stringent policies and regulations for the protection of the environment have led to increased demand for protective coatings having a low VOC content. Aqueous coating compositions having low VOCs also provide reduced odor and toxicity.

Conventional methods for producing low VOC coatings comprising organic polymer binders, such as those formed from the free-radical polymerization of ethylenically unsaturated monomers, include forming polymer compositions having glass transition temperatures (Tg) close to or well below ambient application conditions and combining them with low, if any, levels of coalescing solvents to effectively reduce the minimum film formation temperature of the coating composition. Another common approach for producing low to zero VOC coatings combines polymers with Tgs well above ambient application conditions in combination with a nonvolatile or partially nonvolatile coalescent. Such coalescents may be added as separate ingredients during coating formulation; or they may comprise a polymer generated either during the polymerization of the binder, or generated separately. Coalescents are known to lower the overall Tg of the binder. However, these conventional approaches tend to provide paints having inferior hardness properties, poor blocking resistance, poor soil resistance, and surface tack. Additionally, the use of coalescing solvents that are VOCs is undesirable as these coalescing solvents raise odor, toxicity and environmental concerns.

In order to reduce the VOC level in polyurethane based coatings, aqueous polyurethane dispersions (PUD) have been developed. PUDs fail to completely solve the VOC issue. The best PUDs typically contain N-methylpyrolidone (NMP, an embryo toxin) and triethylamine (TEA). Even the PUDs that are supplied without NMP still require some organic solvent to assure good film formation. An approach to reduce VOC's further and to reduce cost has been to make urethane-acrylic hybrid dispersions. In these hybrids the NMP is at least partially replaced by one or more acrylic monomer during the synthesis. The acrylic monomer is polymerized after the polyurethane has been turned into an aqueous dispersion (PUD) and the acrylic monomer is polymerized in situ forming an urethane-acrylic hybrid. These hybrids are intermediate in cost, between that of a PUD and an acrylic latex. Conventional techniques for forming these urethane-acrylic hybrids are limited in the quantity of the acrylic portion that may be incorporated. Conventional urethane-acrylic hybrids are limited to approximately 50% of the acrylic component. Moreover, to date the performance of these hybrids fails to excel in the same areas as urethane polymers, and, like PUDs, they are still difficult to formulate. Good film formation still requires expensive and aggressive solvents like NMP, and, again like PUDs, pigmentability remains poor. Additionally, like PUD's, urethane-acrylic hybrid polymers to date have shown weakness in outdoor exposure applications, being susceptible to cracking upon extended exposure to UV radiation.

Accordingly, the use of polyurethanes in coatings is mostly limited to the most demanding applications, particularly indoor applications, such as clear coatings for gymnasium hardwood floors.

Fildes and Tobolsky (Journal of Polymer Science, Part A, Vol. 10, (1972), pages 151-161) disclose the use of 2-hydroxyethyl disulfide in the synthesis of a polyurethane containing reactive disulfide linkages, and subsequent photolysis in the presence of a vinyl monomer to produce block copolymers. The reactions are performed in an organic solvent and the formation of block copolymers requires irradiation with UV lamps for at least 90 hours. However, this route to block copolymers is not commercially practical and, moreover, does not address the need for low VOC coatings.

There remains a need for compositions suitable for use in coatings having a low level of VOCs, and which avoid the odor and toxicity concerns associated with current polyurethane coating compositions and provide, at the same time, that level of hardness, blocking resistance, and soil resistance, with a low surface tack as is commonly associated with solvent-borne polyurethane coating compositions. A further unmet need is a waterborne urethane or acrylic-urethane coating suitable for outdoor exposure; that is, with improved UV radiation resistance. The present inventors have endeavored to meet these remaining needs.

STATEMENT OF THE INVENTION

The present invention provides an aqueous composition comprising an acrylic-urethane block copolymer, which block copolymer comprises one or more acrylic polymer block(s) and one or more polyurethane polymer block(s), and a sulfur atom connecting a polyurethane polymer block to an acrylic polymer block.

In another embodiment, the present invention provides composition comprising a stable aqueous dispersion of a copolymer containing acrylic polymer blocks and urethane polymer blocks wherein a) each acrylic block and each urethane block are linked to each other through a sulfur atom; b) the dispersion contains from 30% to 85% water by weight of the total dispersion; and c) the dispersion contains a substantial absence of an organic solvent.

In another embodiment, the block copolymer contains from 55% to 75%, by weight based on the total weight of the block copolymer, of acrylic blocks.

In another embodiment, the block copolymer contains from 65% to 75%, by weight based on the total weight of the block copolymer, of acrylic blocks.

In another embodiment, the dispersion contains from 40% to 60% water by weight of the total dispersion and no organic solvent.

In another embodiment, the present invention is a method comprising the steps of:
a) dispersing into water
   i) a polyurethane prepolymer containing in-chain disulfide groups; and
   ii) a dispersant;
under conditions suitable to form a stable aqueous dispersion of the prepolymer; and
b) contacting the dispersion of the prepolymer from step (a) with an ethylenically unsaturated acrylic monomer and a reducing agent having a standard reduction potential of at least ?? to form a stable aqueous dispersion of a copolymer containing acrylic polymer blocks and urethane polymer blocks, wherein each acrylic block and each urethane block are linked to each other through a sulfur atom.

In another embodiment, the in-chain disulfide groups are —(OCH$_2$CH$_2$S—SCH$_2$CH$_2$O)—groups.

In an embodiment, the weight percent of acrylic polymer is greater than 55% of the total weight of acrylic-urethane block copolymer.

In another embodiment, the weight percent of acrylic polymer is greater than 65%, or greater than 70%, of the total weight of acrylic-urethane block copolymer.

The present invention also provides methods of forming the aqueous composition comprising the acrylic-urethane block copolymer, one such method comprising the steps: forming one or more polyurethane polymer containing one or more disulfide bond; dispersing the polyurethane polymer in an aqueous solution; and iii) performing a polymerization of one or more ethylenically unsaturated acrylic monomer in the presence of one or more reducing agent and the polyurethane polymer containing the disulfide bond.

In one embodiment of the method, the disulfide bond is provided by 2-hydroxyethyl disulfide as a reactant in forming the polyurethane polymer.

In another embodiment of the method, the reducing agent is selected from the group consisting of: isoascorbic acid, malic acid, lactic acid, alkali metal sulfites, alkali metal bisulfites, alkali metal hydrosulfites, alkali metal hyposulfites, alkali metal metabisulfites, sodium formaldehyde sulfoxylate, N,N-dimethyl-p-toluidine, and combinations thereof.

In yet another embodiment of the method, the steps (ii) and (iii) are performed by a mini-emulsion polymerization technique.

The present invention also provides the aqueous composition comprising an acrylic-urethane block copolymer prepared by the methods of the invention.

In another embodiment, the present invention provides aqueous coating compositions containing the inventive aqueous compositions, as well as coatings made from the coating compositions.

Accordingly, the present invention provides coating compositions that provide the benefits normally attributed to organic solvent-borne polyurethanes, but with very low or no VOC. The inventive acrylic-urethane block copolymers also show improved resistance to UV degradation.

Unless otherwise indicated, conditions of temperature and pressure are room temperature and standard pressure.

As used herein, the term "polyurethane" as used in this specification is intended to apply not only to polymers (or prepolymers) made by reacting only polyisocyanates and polyols to give urethane linkages, but also to polymers (or prepolymers) made by reacting polyisocyanates with other types of compound, usually in conjunction with polyols, having other types of isocyanate-reactive groups, thereby to give polymers, prepolymers or polymer segments comprising other types of linkages, for example urea, thiourea, or amide linkages.

Unless otherwise indicated, any term containing parentheses refers, alternatively, to the whole term as if no parentheses were present and the term without them (i.e. excluding the content of the parentheses), and combinations of each alternative. Thus, the term "(meth)acrylic" refers to any of acrylic, methacrylic, and mixtures thereof; and the term "(meth)acrylate" means acrylate, methacrylate, and mixtures thereof.

As used herein, the term "polymer" includes the term "copolymer", and, unless otherwise indicated, the term "copolymer" refers to polymers made from any two or more different monomers, e.g. terpolymers, pentapolymers, etc., and homopolymers functionalized after polymerization so that two or more different functional groups are present in the product copolymer.

Herein, "wt. %" means weight percent.

As used herein, unless otherwise indicated, an "acrylic polymer" herein means a polymer comprising at least 50% by weight of polymerized units of ethylenically unsaturated (meth)acrylates. A "styrene-acrylic polymer" is a polymer comprising at least 50% by weight of polymerized units which are derived from either ethylenically unsaturated (meth)acrylates or styrene, and wherein the polymer comprises at least 5% of each of these types of polymerized unit. Similarly, a "vinyl acetate-acrylic polymer" is a polymer comprising at least 50% by weight of polymerized units which are derived from either ethylenically unsaturated (meth)acrylates or vinyl acetate, and wherein the polymer comprises at least 5% of each of these types of polymerized unit. A polymer segment that is described herein as being acrylic, for example an acrylic portion within an acrylic-urethane block copolymer, is similarly defined with respect to the monomers that comprise that polymer segment.

As used herein, the term "weight of acrylic blocks" refers to the total weight of structural units of the polymerized acrylic monomer; the weight percentage of acrylic blocks are calculated by dividing the total weight of the structural units of the polymerized acrylic monomer by the total weight of the block copolymer. The weight percent ratios assume complete conversion of the known weights of reactants that form the polyurethane polymer and complete conversion of fed monomers during the polymerization of the known weights of the acrylic portion of the copolymer.

As used herein, a "stable aqueous dispersion" of a polymer means a stable dispersion of the polymer in an aqueous medium of which water is the principal component. Minor amounts of organic liquids may optionally be present.

As used herein, the terms "minor amounts" or "substantially absent" refer to levels of organic solvents of less than 1%, preferably less than 0.1%, and most preferably less than 0.01% by weight, based on the weight of the dispersion.

As used herein, the term "ethylenically unsaturated carboxylic acid monomer" refers to acrylic acid, methacrylic acid, beta-acryloxypropionic acid, ethacrylic acid, α-chloroacrylic acid, α-vinylacrylic acid, crotonic acid, α-phenylacrylic acid, cinnamic acid, chlorocinnamic acid, β-styrylacrylic acid, maleic acid, itaconic acid, citraconic acid, cinnamic acid, and salts thereof.

As used herein, the term "functionalized" refers to (co) polymerized monomer units that are modified after polymerization to contain an acid functional group.

As used herein, unless otherwise indicated, the phrase "glass transition temperature" or "Tg" refers to a measured Tg, determined by differential scanning calorimetry (DSC) using a heating rate of 10° C./minute, taking the mid-point in the heat flow versus temperature transition as the Tg value.

As used herein, unless otherwise indicated, the term "molecular weight" refers to the weight average molecular weight of a (co)polymer as measured by gel permeation chromatography (GPC), as calibrated with a polystyrene standard. Gel permeation chromatography, separates the members of a distribution of polymer chains according to their hydrodynamic size in solution rather than their molar mass. The system is then calibrated with standards of known molecular weight and composition to correlate elution time with molecular weight. The term "Mn" refers to the number average molecular weight of a (co)polymer as determined by GPC, as calibrated with a polystyrene standard. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84.

As used herein, unless otherwise indicated, the term "normal boiling point" refers to the boiling point of a liquid at 760 mm/Hg.

The singular forms "a," "an," and "the" include plural referents unless the context clearly dictates otherwise. The endpoints of all ranges directed to the same component or property are inclusive of the endpoint and independently combinable.

Conventional urethane-acrylic hybrids are limited in content to approximately 50 wt. %, based on resin solids, of the acrylic component and provide dried films with domains of polyurethane polymer and domains of acrylic polymer. The inventive method presented here provides acrylic-urethane block copolymers which produce films with a single phase system where the acrylic and urethane components are completely compatible. Moreover, the current invention can provide much higher levels, at least 75 wt. %, based on resin solids, of the polymerized acrylic monomer content.

Conventional urethane-acrylic hybrids are prepared by polymerizing acrylic monomers in situ with the dispersed pre-formed polyurethane polymer. There is no chain scission of the polyurethane polymer and the acrylic portion remains separate from the polyurethane portion. In the present invention, a traditional polyurethane polymer is prepared except one or more initiating fragments is contained within the polyurethane polymer chain, which fragment, in the presence of a reducing agent and one or more acrylic monomer, provides an initiating site for polymerization of acrylic monomers. The latter polymerization forms blocks of acrylic polymer within the polyurethane polymer backbone at sites provided by the initiating fragments. Disulfide molecules may be used to construct the initiating fragments in the polyurethane, and these fragments may be introduced via any of the reactants used in forming the polyurethane. Most conveniently, a disulfide species with two hydroxyl groups may be used in forming the polyurethane polymer, such as, for example, 2-hydroxyethyl disulfide (2HEDS).

2-hydroxyethyl disulfide

As is well known, polyurethane polymers are generally made by reacting one or more organic polyisocyanate with one or more organic compound containing isocyanate-reactive groups, particularly a macro polyol with the optional inclusion of a low molecular weight organic polyol. The reaction may be carried out in the presence of a catalyst such as organic tin compounds and/or tertiary amines.

The polyurethane polymers may be prepared in a "one shot" process in which all of the components may be reacted together, with or without solvent, to form the polyurethane. The reaction temperature may be up to about 150° C., but is preferably from 50° C. to 130° C. A more favored route to their formation involves the formation of an isocyanate-terminated polyurethane prepolymer followed by chain extension with an active hydrogen-containing compound. Any of the components that react to form the polyurethane or polyurethane prepolymer may comprise the initiating fragment of the invention. In one embodiment of the present invention, the latter active hydrogen-containing compound used as a chain extender may comprise the initiating fragment of the invention. In another embodiment, the organic polyisocyanate may comprise the initiating fragment. In another more preferred embodiment, the initiating fragment is provided by the organic compound(s) containing isocyanate-reactive groups used to prepare the isocyanate-terminated polyurethane prepolymer, most preferably a polyol, for example, a diol such as 2-hydroxyethyl disulfide (2HEDS).

The isocyanate-terminated polyurethane prepolymer is normally the reaction product of at least: (i) at least one organic polyisocyanate (i.e. having at least two isocyanate groups); and (ii) at least one organic compound having at least two isocyanate-reactive groups.

Such a reaction is conventionally carried out in an organic liquid(s) medium. This could be wholly in bulk, but is more usually in the presence of an organic solvent liquid (such as NMP, acetone or diglyme, used, for example, to control the viscosity). Preferably, in one embodiment of the present invention, the organic solvent is an ethylenically unsaturated monomer, such as, for example, a (meth)acrylic monomer, acrylonitrile, or styrene. This type of solvent is more readily removed from the final product because the solvent monomer will be reacted away in the later acrylic polymerization step and subsequently chase to remove residual monomer. While the synthesis of the chain extended polyurethane may also be carried out in an organic liquid(s) medium (so as to end up with non-aqueous dispersion of the polyurethane polymer), more preferably it is carried out in an aqueous medium (i.e. with the polyurethane prepolymer present as an aqueous dispersion) so as to end up with an aqueous dispersion of the chain extended polyurethane polymer. This is because low VOC applications of the polyurethane polymers of the invention involve their use as aqueous dispersions.

To facilitate such dispersion of the isocyanate-terminated prepolymer in water to form an aqueous dispersion, the prepolymer may incorporate ionic and/or non-ionic chain pendant dispersing groups. Optionally, this may be achieved during formation of the isocyanate-terminated prepolymer by use of a reactant(s) (iii) which is an isocyanate-reactive and/or diisocyanate compound(s) bearing an ionic and/or non-ionic dispersing group(s), or a group(s) which may subsequently be converted to such a dispersing group(s).

The ionic groups may be cationic or anionic, although anionic groups are preferred. Examples of anionic groups are —$CO_2^-$ (carboxylate salt) and —$SO_3^-$ (sulphonate salt). An example of a cationic group is $R_3N^+$ (ammonium or alkyl ammonium salt). Typically, ionic dispersing groups are anionic salt groups, for example, carboxylate salt groups. Such groups may be provided by employing as a reactant (iii) in the prepolymer formation an isocyanate-reactive compound having at least one acid group and at least two hydroxyl groups. Examples of such compounds include carboxy group-containing diols and (at low levels) triols, for example dihydroxy alkanoic acids such as 2,2-dimethylolpropionic acid (DMPA). If desired, the carboxy containing diol or triol may, for example, be incorporated into a polyester by reaction with a dicarboxylic acid before being incorporated into the prepolymer.

The conversion of any acid groups present in the prepolymer to anionic salt groups may be effected by neutralising the acidic groups before, after or simultaneously with formation of an aqueous dispersion of the prepolymer. Suitable agents for neutralizing carboxylic acid groups are the primary, secondary or tertiary amines. Of these, the trialkyl-substituted tertiary amines are preferred, such as triethylamine. Ammonia itself (ammonium hydroxide) may also be used.

Non-ionic dispersing groups are typically pendant polyoxyalkylene groups, particularly polyoxyethylene groups. Such groups may, for example, be provided by employing as a reactant (iii) in the prepolymer formation diols having pendent polyoxyalkylene chains such as polyoxyethylene, polyoxypropylene, and chains containing mixtures of alkylene oxide units, as is known in the art. These diols, because of their function, are sometimes referred to as dispersing diols.

Non-ionic dispersing groups may also be provided by employing as a reactant (iii) in the prepolymer formation diisocyanates having pendant polyoxyalkylene chains, as is known in the art. Similarly, these diisocyanates, because of their function, are sometimes referred to as dispersing diisocyanates.

The polyurethane prepolymer (and chain extended polyurethane polymer) may, of course, have a combination of dispersing groups. The pendant dispersing group content of the polyurethane (if present) may vary within wide limits but should be sufficient to provide the prepolymer with the required degree of water-dispersability.

Polyisocyanates (i) used in making the prepolymer are well known in the art and include aliphatic, cycloaliphatic and/or aromatic isocyanates containing at least 2 isocyanate groups per molecule.

Suitable aliphatic diisocyanates include, for example, trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate, trimethylhexane diisocyanate.

Suitable cycloaliphatic diisocyanates include, for example, isophorone diisocyanate, cyclopentylene diisocyanate and the hydrogenation products of aromatic diisocyanates such as cyclohexylene diisocyanate, methylcyclohexylene diisocyanate, and methylene dicyclohexyl diisocyanate.

Suitable aromatic diisocyanates include, for example, phenylene diisocyanate, toluene diisocyanates such as 2,4-toluene diisocyanate and 2,6-toluene diisocyanate, xylylene diisocyanate, biphenylene diisocyanate, naphthylene diisocyanate and methylene diphenyl diisocyanate or isomers or isomeric mixtures thereof.

Mixtures of polyisocyanates can be used and also polyisocyanates which have been modified by the introduction of urethane, allophanate, urea, biuret, carbodiimide, uretonimine or isocyanurate residues.

Suitable triisocyanates include, for example, the biuret of hexamethylene diisocyanate and water, the isocyanurate of hexamethylene diisocyanate, the product of addition of isophorone diisocyanate to trimethylolpropane. Preferred polyisocyanates are aliphatic or cycloaliphatic diisocyanates. Particularly preferred is isophorone diisocyanate, and 4,4'-methylene dicyclohexyl diisocyanate.

The at least one organic compound (II) having at least two isocyanate-reactive groups used in the preparation of the prepolymer will usually include at least one such compound which has a weight average molecular weight in the range 400-6000. Such compounds may be organic polyols with reactive hydroxyl groups or they may be compounds with other isocyanate-reactive groups, such as primary amino or carboxyl groups. The isocyanate-reactive organic compound (II) having at least two isocyanate-reactive groups, may or may not be polymeric. The organic polyols particularly include diols and triols and mixtures thereof, but higher functionality polyols may be used, for example, as minor components in admixture with diols. The polyols may be members of any of the chemical classes of polymeric polyols used or proposed for use in polyurethane formulations. In particular the polyols may be polyesters, polyesteramides, polyethers, polythioethers, polycarbonates, polyacetals, polyolefins or polysiloxanes. As stated earlier, any of the organic compound (II) having at least two isocyanate-reactive groups may comprise the initiating disulfide fragment. Preferred polyol molecular weights are from 700 to 3000.

Polyesters suitable for the polyol of the invention include, for example, the hydroxyl-terminated reaction products of polyhydric, preferably dihydric alcohols (to which trihydric alcohols may be added) with polycarboxylic, preferably dicarboxylic acids or their corresponding carboxylic acid anhydrides. Polyester polyols obtained by the ring opening polymerization of lactones, such as ε-caprolactone, may also be included.

Suitable polycarboxylic acids which may be used for the formation of polyester polyols may be aliphatic, cycloaliphatic, aromatic and/or heterocyclic and they may be substituted (e.g. by halogen atoms), saturated or unsaturated. Suitable aliphatic dicarboxylic acids include, for example, succinic acid, glutaric acid, adipic acid, suberic acid, azelaic acid, sebacic acid and dodecanedicarboxylic acid. Suitable cycloaliphatic dicarboxylic acids include for example, hexahydrophthalic acid. Suitable aromatic dicarboxylic acids include for example, isophthalic acid, terephthalic acid, ortho-phthalic acid, tetrachlorophthalic acids and 1,5-naphthalenedicarboxylic acid. Suitable unsaturated aliphatic dicarboxylic acids include for example, fumaric acid, maleic acid, itaconic acid, citraconic acid, mesaconic acid and tetrahydrophthalic acid. Suitable tri- and tetra-carboxylic acids include for example, trimellitic acid, trimesic acid and pyromellitic acid.

Suitable polyhydric alcohols which may be used for the preparation of the polyester polyols include, for example, ethylene glycol, propylene glycol, 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, 1,4-cyclohexanedimethanol, ethylene oxide adducts or propylene oxide adducts of bisphenol A or hydrogenated bisphenol A. Triols or tetraols such as trimethylolethane, trimethylolpropane, glycerine and pentaerythritol may also be used. These polyhydric alcohols are generally used to prepare the polyester polyols by polycondensation with the above-mentioned polycarboxylic acids, but according to a particular embodiment they can also be added as such to the polyurethane reaction mixture. Polyesteramides may also be obtained by the inclusion of aminoalcohols, such as ethanolamine, in polyesterification mixtures.

Polyether polyols which may be used include products obtained by the polymerisation of a cyclic oxide, for example ethylene oxide, propylene oxide or tetrahydrofuran or by the addition of one or more such oxide to polyfunctional initiators, for example water, ethylene glycol, propylene glycol, diethylene glycol, cyclohexane dimethanol, glycerol, trimethylolpropane, pentaerythritol or Bisphenol A. Especially useful polyethers include polyoxypropylene diols and (at low levels) triols, poly(oxyethylene-oxypropylene) diols and (at low levels) triols obtained by the simultaneous or sequential addition of ethylene and propylene oxides to appropriate initiators and polytetramethylene ether glycols (PTMEG) obtained by the polymerization of tetrahydrofuran. Amine-terminated polyetherpolyols may also be used.

Polythioether polyols which may be used include products obtained by condensing thiodiglycol either alone or with other glycols, dicarboxylic acids, formaldehyde, aminoalcohols or aminocarboxylic acids.

Polycarbonates suitable for the polyol of the invention include, for example, the reaction products of diols such as 1,3-propanediol, 1,4-butanediol, 1,6-hexanediol, diethylene glycol, triethylene glycol or tetraethylene glycol with phosgene; with dialkyl- or diarylcarbonates such as diethylcarbonate or diphenylcarbonate, or with cyclic carbonates such as ethylene and/or propylene carbonate.

Polycaprolactams suitable for the polyol of the invention include for example, polycaprolactams (nylon 6) containing, (a) a carboxyl group attached to both ends of the polymer chain, (b) a carboxyl group attached to one end and an acetamide group attached to the other end of the polymer chain, (c) an amino group attached to both ends of the polymer chain, (d) a carboxyl group attached to one end and an amino group attached to the other end of the polymer chain. Particularly preferred is (d) above, a polycaprolactam having a carboxyl group attached to one end and an amino group attached to the other end of the polymer chain.

Suitable polyolefin polyols include hydroxy-terminated butadiene homo- and copolymers.

The at least one organic compound (II) having at least two isocyanate-reactive reactive groups (used in the preparation of the prepolymer) may also optionally include at least one compound, preferably an organic polyol, having molecular weight below 400. These particularly include diols and triols and mixtures thereof, but higher functionality polyols may be used. Examples of such lower molecular weight polyols include ethylene glycol, diethylene glycol, tetraethylene glycol, bis(hydroxyethyl)terephthalate, cyclohexane dimethanol, furan dimethanol, and the reaction products, up to molecular weight 399, of such polyols with propylene oxide and/or ethylene oxide.

The isocyanate-terminated polyurethane prepolymer may be prepared in conventional manner by reacting a stoichiometric excess of the organic polyisocyanate with the polymeric organic compound(s) having at least two (terminal) isocyanate-reactive groups and the other required reactants under substantially anhydrous conditions at an appropriate temperature depending on the particular reactants (usually between 30° and 130° C.) until reaction between the isocyanate groups and the isocyanate-reactive groups is substantially complete. During the production of the isocyanate-terminated prepolymer the reactants are generally used in proportions corresponding to a ratio of isocyanate groups to isocyanate-reactive groups of from about 1.1:1 to about 6:1, preferably from about 1.5:1 to 3:1.

If desired, catalysts (such as dibutyltin dilaurate and stannous octoate may be used to assist prepolymer formation. A non-reactive organic solvent may be added before or after prepolymer formation to control the viscosity. The preferred solvents are water-miscible solvents such as N-methylpyrrolidone, dimethyl sulphoxide, diglyme (dimethyl ether of diethylene glycol), proglyme (dimethyl ether of dipropylene glycol), and dialkyl ethers of glycol acetates or mixtures of N-methylpyrrolidone and methyl ethyl ketone.

Aqueous prepolymer dispersions may, as discussed supra, be prepared by dispersing the isocyanate-terminated polyurethane prepolymer as an organic liquid medium, usually including an organic solvent, in an aqueous medium using, for example, surfactants, or the self-dispersability of the prepolymer if dispersing groups are present therein (although surfactants may still be employed if desired). The prepolymer may be dispersed in water using techniques well known in the art. Preferably, the prepolymer is added to the water with agitation or, alternatively, water may be stirred into the prepolymer.

The chain extension performed in step 2) is conveniently conducted at temperatures in the range of 5° C. to 95° C., more usually 10° C. to 45° C., depending on the reactants being used. Chain extension of the dispersed polyurethane prepolymer may be performed with an active hydrogen-containing compound, including any of those discussed above as having isocyanate-reactive groups in forming the urethane prepolymer. Accordingly, chain extension may be performed using any of the polyols discussed above, or, for example, by utilizing one or more diamine, e.g. ethylene diamine, or alkanolamine, using methods well known in the art.

The resulting chain extended polyurethane dispersion may be anionic salt functional, non-ionic or anionic polyurethane dispersion. The polyurethane dispersion may be formed by any suitable method, as is known in the art.

In one embodiment of the invention, the polyurethane dispersion may be an anionic polyurethane dispersion that may be prepared by reacting at least one of polyol with an organic compound having at least one acid group and at least two active hydrogen functionalities, and a polyisocyanate. In this embodiment, suitable organic compounds having at least one acid group and at least two active hydrogen functionalities include, for example, 2,2-dimethylolacetic acid, 2,2-dimethylolpropionic acid, 2,2-dimethylol-butanoic acid, 2,2-dimethylolpentanoic acid. Preferred is 2,2-dimethylolpropionic acid. Examples of acid groups suitable for the organic compound include, carboxylic acid, sulfonic acid, phosphoric acid, phosphonic acid and the like. Preferred is the carboxylic acid group.

The molecular weight of the resulting polyurethane may be from 2,000 to 50,000, preferably from 6,000 to 30,000, and most preferably from 8,000 to 20,000.

Before dispersing the polyurethane in water it may be at least partially neutralized with a tertiary amine or aminoalcohol. Suitable tertiary amines include, for example, trimethylamine, triethylamine, dimethylaniline, diethylaniline and N-methyl morpholine, and N-ethyl morpholine. Suitable aminoalcohols include dimethyl ethanolamine and triethanolamine. After neutralization, the polyurethane may be diluted with deionized water under agitation to yield a finely divided dispersion.

The polymer solids content of the resulting dispersions will typically be from 20 to 60% by weight, more commonly 25 to 50% by weight.

The initiating fragment in the polyurethane may be a disulfide or a trisulfide, for example, but is preferably a disulfide. Any molecule possessing either a disulfide or trisulfide functionality, and having the appropriate reactive functionalities to react into the polyurethane polymer, may be suitable for incorporation into the polyurethane polymer. A particularly preferred disulfide that can be readily incorporated into a polyurethane polymer is 2-hydroxyethyl disulfide (2HEDS). The inventive acrylic-urethane block copolymers are prepared by polymerization of acrylic monomers in the presence of the disulfide-containing PUD, as described in the Examples below. The polymerization occurs at the site of the scission of the disulfide bond in the polyurethane polymer.

The initiating fragment in the polyurethane polymer may be used alone, but is much more efficient when it functions as the oxidizing component of a redox system, which also includes a reducing component, such as isoascorbic acid, malic acid, or lactic acid, or an alkali metal sulfite, for example, a bisulfite, a hydrosulfite, hyposulfite, or metabisulfite, such as sodium bisulfite, sodium hydrosulfite (Lykopon), potassium hyposulfite, potassium metabisulfite, or sodium formaldehyde sulfoxylate or N,N-dimethyl-p-toluidine.

The initiating fragment and the reducing component may be used in proportions from 0.001 wt. % to 5 wt. % each, based on the combined weight of solids of the reactive species and the ethylenically unsaturated monomers in the monomer mixture that are polymerized.

Polymers and copolymers, including polymeric segments within an acrylic-urethane block copolymer, described herein as "acrylic" may encompass other monomers in addition to acrylic monomers. Moreover, the "acrylic" portion of the acrylic-urethane block copolymer may also be a styrene-acrylic polymer or a vinyl acetate-acrylic polymer.

The acrylic portion of the copolymer(s) may be prepared from a wide range of polymerizable ethylenically unsaturated monomers, such as, for example, nonionic ethylenically unsaturated monomers, including α,β-monoethylenically unsaturated monomers, such as alkyl(meth)acrylates. Suitable nonionic ethylenically unsaturated monomers include arylenes, such as styrene, vinyl toluene, and α-methyl styrene; butadiene; olefins, such as, ethylene, propylene; vinyl esters, such as vinyl acetate, and vinyl versatate; vinyl halides, e.g. vinyl chloride; vinylidene chloride; (meth)acrylonitrile; $C_1$-$C_{40}$ alkyl esters of (meth)acrylic acid; for example, methyl(meth)acrylate, ethyl (meth)acrylate, n-butyl(meth)acrylate, 2-ethylhexyl(meth)acrylate, lauryl(meth) acrylate, and stearyl(meth)acrylate; other (meth)acrylates, such as benzyl(meth)acrylate, and phenyl(meth)acrylate; (poly)alkoxyalkyl(meth)acrylates, such as ethoxyethyl (meth)acrylate; and mono-, di-, tri-alkyl esters of ethylenically unsaturated di- and tri-carboxylic acids and anhydrides, such as ethyl maleate, dimethyl fumarate, and ethyl methyl itaconate.

A mixture of monomers which includes both acrylates and methacrylates may result in inhibition of the polymerization of the acrylates by the methacrylates, leading to high residual acrylate monomer at the end of the acrylic-urethane copolymer synthesis. This issue may be resolved by pre-charging the acrylate and feeding the methacrylate monomer, although the polymerization proceeds more slowly than for an all methacrylate system.

Suitable polymerizable monomers may further include at least one multiethylenically unsaturated monomer. Examples of multiethylenically unsaturated monomers that may be used include allyl(meth)acrylates; glycol di(meth)acrylates, such as, ethylene glycol di(meth)acrylate, 1,6-hexanediol di(meth) acrylate, 1,3-butylene glycol di(meth)acrylate, polyalkylene glycol di(meth)acrylate; diallyl phthalate; polyol di- or tri-(meth)acrylates, such as trimethylolpropane tri(meth)acrylate; and aromatic di- and tri-vinyl monomers, such as, divinylbenzene, and divinyltoluene.

Optionally, the copolymer may further contain as polymerized units, ionic ethylenically unsaturated monomers such as amide containing monomers, such as (meth)acrylamide, and ethylenically unsaturated carboxylic acid monomers, such as (meth)acrylic acid. Acid monomers are often present, to some extent, in their deprotonated form, and so can also be referred to as anionic monomers. In one embodiment, suitable levels of ionic ethylenically unsaturated monomer may be in the range of 0 to 10 weight %, preferably 0.1 to 5 weight %, and more preferably 0.5 to 4 weight %, based on the dry weight of the polymer particles.

The copolymer of the present invention may optionally have one or more acid functional group chosen from a phosphorus acid-functional group, a polymeric side chain containing multi-acid functional groups, salts thereof, and combinations thereof. The phosphorus acid-functional group may be a (di)hydrogen phosphate group, phosphonate group, phosphinate group, alkali metal salt thereof, other salt thereof, or a combination thereof. Suitable phosphorus acid group containing monomers may include, for example, dihydrogen phosphate functional monomers, such as (di)hydrogen phosphate esters of an alcohol containing a polymerizable vinyl or olefinic group, like allyl phosphate, mono- or diphosphate of bis(hydroxy-methyl) fumarate or itaconate, and phosphates of hydroxyalkyl(meth)acrylates including 2-hydroxyethyl (meth)acrylate, 3-hydroxypropyl (meth)acrylates. Other suitable monomers may include, for example, phosphonate functional monomers, like vinyl phosphonic acid, allyl phosphonic acid, α-phosphonostyrene, 2-(meth)acrylamido-2-methylpropanephosphonic acid. Further suitable monomers may have phosphinate groups, such as, for example, 1,2-ethylenically unsaturated (hydroxy)phosphinylalkyl (meth)acrylate monomers, like (hydroxy)-phosphinylmethyl methacrylate. Preferred phosphorus acid monomers include phosphoethyl(meth)acrylate. The copolymer may contain phosphorus acid-functional group containing monomer at levels in the range of 0.1 to 20 wt. %, or 0.25 to 10 wt. %, preferably from 0.5 to 5 wt. %, and more preferably from 1 to 3 wt. %, based on the weight of the copolymer.

Alternatively, a polymer or a copolymer may be functionalized post-polymerization to give acid functional groups. Acid functional groups may also include multi-acid functional groups that are formed from ethylenically unsaturated monomers and that contain multiple acid groups. The multi-acid functional groups may be incorporated into the polymer, for example, by including as polymerized units, a terminally unsaturated multiacid macromonomer.

Other suitable polymerizable monomers include functional monomers, for example, small amounts of adhesion-promoting monomers. Examples of such functional monomers include hydroxy-functional monomers, such as, 2-hydroxyethyl(meth)acrylate; amino-functional monomers, such as N,N'-dimethylaminoethyl(meth)acrylate; epoxy-functional monomers, such as glycidyl(meth)acrylate; keto-functional monomers, such as (meth)acrolein and diacetone (meth)acrylamide; autooxidizable monomers like acetoacetoxyalkyl(meth)acrylates, e.g. acetoacetoxyethyl(meth) acrylate, dicyclopentadienyl(meth)acrylate; isocyanate-functional monomers such as dimethyl metaisopropenyl benzyl isocyanate and isocyanato ethyl methacrylate; N-vinyl pyrrolidone; and polymerizable surfactants, including, but not limited to, Trem® LF-40 (Trem is a trademark of Henkel Corporation, King of Prussia, Pa.).

To limit the water sensitivity of the copolymer, the total amount of phosphorus acid, multi-acid, acid, hydroxyl, amine, ketone, aldehyde, aldol, keto-ester (acetoacetoxy), or aldimine group functional groups in the copolymer should not exceed 45 wt. %, or, alternatively, should not exceed 35 wt. %.

The polymerization of the acrylic portion of the acrylic-urethane copolymers of this invention may be prepared by any known process which provides copolymerization of ethylenically unsaturated monomers. Suitable processes include suspension or emulsion polymerization at known polymerization temperatures of from room temperature to about 90° C. which may be optimized for the catalyst system employed. The acrylic portion of the acrylic-urethane block copolymers may have monomer compositions like those of polymeric latex binders prepared by standard emulsion polymerization techniques known in the art, and, similarly, the dispersed acrylic-urethane copolymers may have particle sizes and particle size distributions similar to those of PUD's and urethane-acrylic hybrids prepared by procedures known in the art. In addition, the copolymers of the invention may have a unimodal or a multimodal, including a bimodal, particle size distribution.

Polymerization techniques for preparing an aqueous dispersion of acrylic copolymers from ethylenically unsaturated monomers are well known in the polymer arts, and any conventional emulsion technique for preparing copolymers including single stage processes and multiple stage polymerization processes may be used. Preferably, the acrylic-urethane block copolymers are prepared by polymerization in an aqueous medium. In the event the monomers include phosphorus acid monomers, discussed above, then more preferably, the aqueous polymerization is conducted at a pH below 5, more preferably at a pH below 4, and most preferably in a pH range of 1 to 4. In one embodiment, the aqueous polymerization of the copolymers containing, as polymerized units, dihydrogen phosphate functional monomers is conducted in a pH range of 1 to 2.

Although not required, one or more conventional polymerization initiator optionally may be used, in addition to the disulfide initiating fragment, in carrying out the polymerization to form the polymer particles. Examples of polymerization initiators which may be employed include water-soluble and water-insoluble polymerization initiators which thermally decompose at the polymerization temperature to generate free radicals, such as persulfates, like ammonium or alkali metal (potassium, sodium, or lithium) persulfate; azo compounds, such as 2,2'-azobis(isobutyronitrile), 2,2'-azobis(2,4-dimethylvaleronitrile), and 1-t-butyl azocyanocyclohexane; hydroperoxides, such as t-butyl hydroperoxide and cumene hydroperoxide; peroxides such as, di-t-butyl peroxide; peresters such as t-butyl peracetate; as well as percarbonates, such as di(1-cyano-1-methylethyl)peroxy dicarbonate; and perphosphates. Moreover, such species may be utilized in the chase toward the end of the polymerization reaction, in order to minimize residual monomer.

Chain transfer agents may optionally be used to control the molecular weight of the acrylic portion of the polymer particles. Examples of suitable chain transfer agents include mercaptans, polymercaptans, and polyhalogen compounds, including alkyl mercaptans such as ethyl mercaptan, n-butyl mercaptan, cyclohexyl mercaptan, and n-dodecyl mercaptan; alcohols such as isopropanol; halogenated compounds, such as trichlorobromoethane. Generally from 0 to 10% by weight, based on the weight of the ethylenically unsaturated monomers in the acrylic monomer mixture used to prepare the acrylic portion of the polymer particles, may be used. The molecular weight of the acrylic polymer may be controlled by other techniques known in the art, such as selecting the ratio of an added initiator to ethylenically unsaturated monomer.

Aggregation of the copolymers may be discouraged by including a stabilizing surfactant or dispersant in the polymerization mixture in the polymerization vessel. Many examples of surfactants suitable for emulsion polymerization are given in McCutcheon's Detergents and Emulsifiers (MC Publishing Co., Glen Rock, N.J.), published annually. Other types of stabilizing agents such as protective colloids, may also be used. For example, methyl cellulose and hydroxyethyl cellulose may be included in the polymerization mixture.

The acrylic-urethane block copolymers may be prepared as an aqueous dispersion or suspension with a solids level of from 20 to 55 weight %, preferably in the range of from 30 to 50 weight %. The higher levels of solids, for example 45-55% solids, may be achieved by reducing the amount of disulfide initiating fragment while adding 1,4-butanediol.

Acrylic-urethane block copolymers produced via disulfide initiation may also be prepared by a mini-emulsion polymerization process, as described in the Examples (below). In general terms, this alternative procedure involves the formation of a polyurethane polymer containing the initiating fragment, preferably using an unsaturated monomer as the solvent. Once the polyurethane synthesis is complete, further acrylic monomers are added in combination with a suitable hydrophobe (such as, for example, stearyl methacrylate). Subsequently, this mixture is emulsified with water and surfactant to form a mini-emulsion. The unsaturated monomers in the mini-emulsion are then polymerized by the addition of a reducing agent, as described earlier. Both synthesis methods are expected to require a post reaction to reduce residual unsaturated monomer. This post reaction can be performed by a more traditional radical initiation reaction, or chase, as known in the art. Few traditional urethane-acrylic hybrids are made at solids of 50% or greater. The mini-emulsion approach with the inherent larger particle size is able to achieve 50% solids, and higher, enabling the inventive acrylic-urethane copolymer dispersions to handle like traditional latexes, the latter being significantly more user friendly than PUDs.

The aqueous composition of the invention may further include at least one coalescent which may be volatile or non-volatile or slow-evaporating. Examples of suitable coalescents are chosen from diacid esters, phosphate esters, isobutyrate esters, soy methyl esters, alkyl esters of fatty acids, fatty ethers, fatty glycerides, fatty acid amides, alkoxylates of fatty acids, addition (co)polymer coalescents, and mixtures thereof, as are known in the art. In one embodiment of the invention, the coalescent may be added as an independent component during formulation of the composition of the invention.

Alternatively, the coalescent may be an addition (co)polymer coalescent, which may be prepared separately from the copolymer, or it may be formed in the presence of the acrylic copolymer of the invention, or the acrylic copolymer may be formed in the presence of the addition (co)polymer coalescent.

Suitable total amounts of any added coalescent will vary in proportion to the Tg of the copolymers, as more of the coalescent may be needed for a higher Tg component copolymer. Suitable amounts of the coalescent may be 2 wt. % or more, or, 5 wt. % or more, or 7 wt. % or more, based on the total weight of the copolymers, and may range up to 40 wt. %, or up to 30 wt. %, or less than 25 wt. %. Suitable minimum amounts of the addition polymer coalescent may be at least 5 wt. %, or at least 7 wt. %, or at least 10 wt. %, based on the total weight of the copolymers.

The compositions of the invention are suitable for use in pigmented and unpigmented coating compositions for a variety of substrates such as metal, plastic, wood, and cementitious substrates, such as Portland cement based substrates, and natural stone. These coating compositions may be used in interior and exterior architectural coatings and industrial coatings, as well as flooring coatings, such as gym floors, and deck stains. Coating compositions of the invention provide the benefits normally attributed to solvent-borne polyurethanes, but with VOC and odor levels better than solvent-borne polyurethane compositions, aqueous PUD's, and aqueous urethane-acrylic hybrid polymers. The inventive block copolymers also show improved resistance to UV degradation. In formulating coating compositions, additives known in the art, such as external crosslinkers, e.g. diamines or polyamines, may be used, as well as conventional formulation additives including, but not limited to, for example: other polymers or emulsion-polymerized addition polymers, surfactants, emulsifiers, pigments, fillers, extenders, dispersants, anti-migration aids, curing agents, coalescents, wetting agents, preservatives, biocides, mildewcides, plasticizers, anti-foaming agents, defoamers, colorants, dyes, pearlescents, adhesion promoters, waxes, leveling agents, optical brighteners, ultraviolet stabilizers, rheology modifiers, or anti-oxidants.

Conventional coatings application methods such as, for example, brushing, rolling, and spraying methods such as, for example, air-atomized spray, air-assisted spray, airless spray, high volume low pressure spray, and air-assisted airless spray may be used to apply the aqueous polymer composition of this invention. Additionally, for some systems, other application techniques may be used to apply the aqueous polymer composition, such as, caulk gun, roll coaters, and curtain coaters. The aqueous polymer composition may be advantageously applied to substrates such as, for example, plastic, wood, metal, primed surfaces, previously painted surfaces, weathered painted surfaces, glass, composites, and cementitious substrates. Drying is typically allowed to proceed under ambient conditions such as, for example, at 0° C. to 35° C. but may be accelerated with heat or low humidity.

The present invention also provides methods of forming aqueous compositions comprising the inventive acrylic-urethane block copolymers, one such method comprising the steps: i) forming one or more polyurethane polymer containing one or more disulfide bond; ii) dispersing the polyurethane polymer in an aqueous solution; iii) performing a polymerization of one or more ethylenically unsaturated acrylic monomer in the presence of one or more reducing agent and the polyurethane polymer containing the disulfide bond. For reasons of practicality, the inventive methods do not comprise a step including photolysis, or the action of UV light, on the aqueous composition.

Optionally, the method may include the step of formulating to provide an aqueous coating composition comprising the inventive acrylic-urethane block copolymers.

EXAMPLES

These examples illustrate specific embodiments of the present invention. In the examples, the following abbreviations are used:

2HEDS 2-hydroxyethyl disulfide
PUD polyurethane dispersion
DESW™ Dicyclohexylmethane diisocyanate, Bayer Corporation, Pittsburgh, Pa.
DMPA dimethylol propionic acid
DBTL dibutyl tin laurate
PTMEG-1000 poly(tetrahydrofuran). Mn ~1000
PTMEG-650 poly(tetrahydrofuran). Mn ~650
DPGDME dipropyleneglycol dimethylether
NMP N-methylpyrolidone
TEMPO 2,2,6,6-Tetramethyl-1-piperidinyloxy, free radical
TEA triethylamine
EDA ethylene diamine
BMA n-butyl methacrylate
BA n-butyl acrylate
MMA methyl methacrylate
EHA 2-ethylhexyl acrylate
iAA iso-ascorbic acid (98%)
SH Sodium hydrosulfite (85%) Sigma Aldrich ($Na_2S_2O_4$)
SSF sodium hydroxymethanesulfinate (96%)
tBHP t-butyl hydroperoxide (70% aq.)
SLS sodium lauryl sulfate
Triton XN-45S surfactant (61%), Dow Chemical Company, Midland, Mich., USA.

Example 1

Synthesis of 2HEDS-Containing PUD

A 1 liter 3 neck flask equipped with a reflux condenser and a nitrogen inlet tube was charged with 21.0 grams of DMPA and 120 grams of NMP. To this mixtures was added in order: 12.0 grams 2HEDS, 291.4 grams of PTMEG-1000 and 275.6 grams of DESW (Desmodur W). Agitation was started and a nitrogen atmosphere was created in the reactor. The mixture was heated to 90° C. After 1 hour at 90° C., 0.6 grams DBTL was added and the mixture was kept at 90° C. for another 2 hours at before cooling to 45° C. The residual NCO content at this point was measured to be 5.84 wt %. When the temperature reached 45° C., 15.5 grams of triethylamine were added to the batch. The batch was stirred for about 10 minutes before 687.6 grams of the mixture were dispersed into 1009.4 grams of de-ionized water. During the dispersion process the temperature of the dispersion was kept between 15° C. and 18° C. When the dispersion process was completed the dispersion was stirred for an additional 15 minutes before 27.3 grams ethylene diamine mixed with 27.3 grams of water was added to the dispersion. The dispersion was stirred for 30 minutes before the batch was filtered over a 100 Mesh screen. The final dispersion had a solids content of 33.6% by weight and had a particle size of 67 nm.

Example 2

Synthesis of 2HEDS-Containing PUD with Reduced Level of Polyol

A 1 liter 3 neck flask equipped with a reflux condenser and a nitrogen inlet tube was charged with 19.9 grams of DMPA and 75.0 grams of NMP. To this mixtures was added in order: 11.4 grams 2HEDS, 99.3 grams of PTMEG-1000 and 169.4 grams of Desmodur W. Agitation was started and a nitrogen atmosphere was created in the reactor. The mixture was heated to 90° C. After 1 hour at 90° C., 0.3 grams DBTL was added and the mixture was kept at 90° C. for another 2 hours at before cooling to 65° C. The residual NCO content at this point was measured to be 6.93 wt %. When the temperature reached 65° C., 14.6 grams of triethylamine were added to the batch. The batch was stirred for about 10 minutes before 358.8 grams of the mixture were dispersed into 484.5 grams of de-ionized water containing 3.58 grams of SLS, 5.8 grams Triton XN455 and 1.11 grams of triethyl amine. During the dispersion process the temperature of the dispersion was kept between 15° C. and 20° C. When the dispersion process was completed the dispersion was stirred for an additional 15 minutes before 16.27 grams ethylene diamine mixed with 16.27 grams of water was added to the dispersion. The dispersion was stirred for 30 minutes before the batch was filtered over a 100 Mesh screen. The final dispersion had a measured solids content of 36.2% by weight and had a particle size of 29 nm.

Table 1, below, shows how the quantities of reactants and reagents added relates to the composition of the final PUD.

TABLE 1

Weight % of Components in PUD of Example 2

| Ingredient | Example 2 Additions (g, wet) | Solid wt. (g) | Weight % (based on solids of prepolymer) | Weight % (based on solids of PUD) |
|---|---|---|---|---|
| Prepolymer | | | | |
| NMP | 75.0 | — | — | — |
| DMPA | 19.9 | 19.9 | 6.6 | 6.3 |
| 2HEDS | 11.4 | 11.4 | 3.8 | 3.6 |
| PTMEG-1000 | 99.4 | 99.4 | 33.1 | 31.3 |
| Desmodur W | 169.4 | 169.4 | 56.5 | 53.3 |
| DBTL | 0.3 | 0.3 | 0.1 | — |
| TEA | 15.0 | — | — | — |
| Total in Prepolymer Dispersion | 390 | 300 | 100 | — |
| Water | 527 | — | — | — |
| SLS | 3.5 | 3.5 | — | — |
| Triton XN45S (61%) | 5.8 | 3.5 | — | — |
| TEA | 1.1 | — | — | — |
| EDA | 17.7 | 17.7 | — | 5.6 |
| Water with EDA | 17.7 | — | — | — |
| Total in PUD | — | 317.7* | — | 100 |

*The surfactants remain in the water and do not contribute to the PUD solids. The weight % of a given component based on the solids of the PUD is the solid weight of the component (column 2) divided by the total solid weight of the PUD (317.7).

Examples 3-9

Synthesis of PUDs

Examples 3-9 all follow the procedure of Example 2 as described above, with the modifications to the reagents as shown in Tables 1 and 2. Examples 3 and 4 continue the series of 2HEDS-containing PUDs with reduced levels of polyol. Example 5 is a comparative example (forming a conventional PUD) that utilizes 1,4-butanediol in place of the 2-hydroxyethyl disulfide of the current invention. Examples 6-9 provide 2HEDS-containing PUDs using BMA (Example 6), MMA (Example 7), and DPGDME (Examples 8 and 9) as the solvent in the polyurethane-prepolymer step of the synthesis. Tables 2 and 3, below, show quantities of reactants and reagents used in preparing PUD Examples 1-9.

TABLE 2

Reactants and Reagents (grams) for Preparation of PUDs, Examples 1-5

| Ingredient | Example 1 | Example 2 | Example 3 | Example 4 | Example 5* |
|---|---|---|---|---|---|
| NMP | 120.0 | 75.0 | 75.0 | 75.0 | 60.0 |
| DMPA | 21.0 | 19.9 | 23.0 | 25.3 | 15.0 |
| 2HEDS | 12.0 | 11.4 | 21.5 | 29.4 | — |
| 1,4-Butanediol | — | — | — | — | 4.5 |
| PTMEG-1000 | 291.4 | 99.4 | 60.2 | 29.9 | 127.9 |
| Desmodur W | 275.6 | 169.4 | 195.3 | 215.4 | 152.6 |
| DBTL | 0.6 | 0.3 | 0.3 | 0.3 | 0.3 |
| (measure NCO, wt. %) | (5.8%) | (6.9%) | (7.9%) | (8.5%) | (6.6%) |
| TEA | 15.5 | 15.0 | 16.8 | 18.4 | 11.0 |
| Prepolymer/DI H2O[1] | 687/1009 | 359/484.5 | 354/586 | 338/600 | 342/505 |

TABLE 2-continued

Reactants and Reagents (grams) for Preparation of PUDs, Examples 1-5

| Ingredient | Example 1 | Example 2 | Example 3 | Example 4 | Example 5* |
|---|---|---|---|---|---|
| EDA (50% aq. soln) | 54.6 | 32.5 | 36.6 | 37.4 | 29.8 |
| Solids Content (by wt) | 33.6% | 36.2% | 33.6% | 33.4% | 34.6% |
| Particle Size (nm) | 67 nm | 29 nm | 28 nm | 24 nm | 36 nm |

*Comparative

[1] For examples 2-5, the deionized water for dispersing the prepolymer contained 3.5 g SLS and 5.8 g Triton XN45S, and also TEA varying as follows for Examples 2-5, respectively: 1.11 g, 0.84 g, 0.91 g, and 0.55 g.

TABLE 3

Reactants and Reagents (grams) for Preparation of PUDs, Examples 6-9

| Ingredient | Example 6 | Example 7 | Example 8 | Example 9 |
|---|---|---|---|---|
| BMA (+50 ppm TEMPO) | 52.9 | — | — | — |
| MMA (+50 ppm TEMPO) | — | 105.9 | — | — |
| DPGDME | — | — | 120.0 | 52.9 |
| DMPA | 21.0 | 42.0 | 21.0 | 21.0 |
| 2HEDS | 3.0 | 6.0 | 12.0 | 3.0 |
| PTMEG-650 | 111.3 | — | — | — |
| PTMEG-1000 | — | 261.3 | 291.4 | 120.0 |
| Desmodur W | 164.7 | 290.7 | 275.6 | 156.0 |
| DBTL | 0.3 | 0.6 | 0.6 | 0.3 |
| (measure NCO, wt. %) | (6.1%) | (5.6%) | (5.6%) | (6.7%) |
| TEA | 15.5 | 31.2 | 15.6 | 15.4 |
| Prepolymer/DI H2O [1] | 299/515 | 675/1030 | 693/1009 | 332/515 |
| EDA (50% aq. soln) | 23.9 | 49.2 | 55.0 | 29.1 |
| Solids Content (by wt) | 26.8% | 28.3% | 33.7% | 34.0% |
| Particle Size (nm) | 30 nm | 27 nm | 105 nm | 27 nm |

[1] The deionized water for dispersing the prepolymer of Example 6 contained 1.8 g SLS, 2.9 g Triton XN45S, and 0.76 g TEA. The deionized water for dispersing the prepolymer of Example 7 contained 3.5 g SLS, 5.8 g Triton XN45S, and 1.56 g TEA; additional water (322 g) was added in Example 7 to aid viscosity control.

TABLE 4

Overview of PUDs in Examples 1-9

| | Example 1 | Example 2 | Example 3 | Example 4 | Example 5* |
|---|---|---|---|---|---|
| solvent in prepolymer | NMP | NMP | NMP | NMP | NMP |
| DMPA in prepolymer (wt %) | 3.5 | 6.6 | 7.7 | 8.4 | 5 |
| 2HEDS in prepolymer (wt %) | 2 | 3.8 | 7.2 | 9.8 | — |
| 1,4-butanediol in prepolymer (wt %) | — | — | — | — | 1.5 |
| PTMEG-650 in prepolymer (wt %) | — | — | — | — | — |
| PTMEG-1000 in prepolymer (wt %) | 48.6 | 33.1 | 20.1 | 10 | 42.6 |
| Desmodur W in prepolymer (wt %) | 45.9 | 56.5 | 65.1 | 71.8 | 50.9 |
| NCO/OH ratio | 2 | 2 | 2 | 2 | 2 |
| NCO theoretical (wt %) | 6.07 | 7.5 | 8.31 | 9.16 | 6.76 |
| NCO actual (wt %) | 5.84 | 6.93 | 7.93 | 8.51 | 6.6 |
| EDA/NCO ratio | 0.95 | 0.95 | 0.95 | 0.95 | 0.95 |
| TEA/DMPA ratio | 1 | 1 | 1 | 1 | 1 |
| TEA/DMPA ratio in dispersion | 1 | 1.05 | 1.05 | 1.05 | 1.05 |
| prepolymer solids | 83.3 | 80 | 80 | 80 | 83.3 |

*Comparative

TABLE 5

Overview of PUDs in Examples 6-9

| | Example 6 | Example 7 | Example 8 | Example 9 |
|---|---|---|---|---|
| solvent in prepolymer | BMA | MMA | DPGDME | DPGDME |
| DMPA in prepolymer (wt %) | 7 | 7 | 3.5 | 7 |
| 2HEDS in prepolymer (wt %) | 1 | 1 | 2 | 1 |
| 1,4-butanediol in prepolymer (wt %) | — | — | — | — |
| PTMEG-650 in prepolymer (wt %) | 37.1 | — | — | — |
| PTMEG-1000 in prepolymer (wt %) | — | 43.5 | 48.6 | 40 |
| Desmodur W in prepolymer (wt %) | 54.9 | 48.5 | 45.9 | 52 |
| NCO/OH ratio | 1.8 | 1.8 | 2 | 2 |
| NCO theoretical (wt %) | 6.61 | 5.84 | 6.07 | 7.05 |
| NCO actual (wt %) | 6.14 | 5.6 | 5.57 | 6.73 |
| EDA/NCO ratio | 0.95 | 0.95 | 1 | 0.95 |
| TEA/DMPA ratio | 1 | 1 | 1 | 1 |
| TEA/DMPA ratio in dispersion | 1.05 | 1.05 | 1 | 1 |
| prepolymer solids | 85 | 85 | 83.3 | 85 |

Example 10

Acrylic-Urethane Copolymers Based on the PUD of Example 2

A 1 liter 3 neck flask equipped with a reflux condenser and a nitrogen inlet tube was charged with 149.1 grams of deionized water and 200.0 grams (wet) of the PUD prepared in example 2. Agitation was started and a nitrogen atmosphere was created in the reactor. Over a period of 10 minutes, 27.4 grams of BMA (neat monomer) was fed into the reactor. After this addition the reactor was heated to 85° C. When the reactor reached 85° C., the monomer feed and the reductant feed were started. The monomer feed consisted of 82.3 grams of BMA and the reductant feed consisted of a mixture of 1.03 grams sodium hydrosulfite, 15.0 grams of deionized water and 20.0 grams 0.5N NaOH. The monomer was fed into the reactor over a period of 45 minutes, the reductant feed was fed into the reactor over a period of 75 minutes. At the end of the reductant feed the temperature was held at 85° C. for 30 minutes before a mixture of 0.6 grams tBHP (70%) and 30.0 grams deionized water were fed into the reactor over a period of 30 minutes. At the end of this feed the batch was cooled to room temperature and filtered over a 100 mesh screen. The final dispersion had a solids content of 34.5%, a particle size of 71 nm and the pH was 8.5. At the beginning of the tBHP feed the residual BMA level was 0.2 wt %; the final product contained 91 ppm BMA.

Example 11-20

Acrylic-Urethane Copolymers Based on the PUDs of Examples 3-9

Examples 11-20 all follow the procedure of Example 10 as described above, with the modifications to the reagents as shown in Tables 6 and 7 (below). Example 13 is a comparative example since the urethane-acrylic hybrid is formed from a conventional PUD that utilizes 1,4-butanediol in place of the 2-hydroxyethyl disulfide of the current invention.

TABLE 6

Reactants and Reagents (grams) for Preparation of Acrylic-Urethane Copolymers

|  | Example 10 | Example 11 | Example 12 | Example 13* | Example 14 |
|---|---|---|---|---|---|
| PUD used | Example 2 | Example 3 | Example 4 | Example 5 | Example 6 |
| PUD (wet, ~33% solids) | 200 | 200 | 200 | 200 | 175 |
| DI Water | 149.1 | 160.6 | 193.1 | 111.2 | 230.2 |
| BMA | 27.4 | 31.8 | 36.4 | 17.9 | 26.4 |
| Monomer Feed | (45 mins) | (60 mins) | (60 mins) | (30 mins) | (45 mins) |
| BMA | 82.3 | 95.3 | 109.0 | 53.5 | 105.5 |
| Reductant Feed | (75 mins) | (90 mins) | (90 mins) | (60 mins) | (75 mins) |
| Reductant[1] | 1.03 SH | 1.46 SH | 1.46 SH | 0.24 iAA | 0.29 iAA |
| DI Water | 15.0 | 18.8 | 18.8 | 20.0 | 15.0 |
| 0.5N NaOH solution Chase | 20.0 | 22.6 | 22.6 | (to pH 8) | 3.9 |
| tBHP (70%) | 0.60 | 0.45 | 0.45 | 0.45 | 0.17 |
| DI Water | 30.0 | 30.0 | 30.0 | 30.0 | 2.0 |
| Solids Content (wt. %) | 34.5% | 34.0% | 33.1% | 34.1% | 30.1% |
| Particle Size (nm) | 71 nm | 85 nm | 75 nm | 59 nm | 67 nm |
| Residual BMA (ppm) | 91 ppm | 50 ppm | 89 ppm | 53 ppm | 275 ppm |

*Comparative
[1]Reductant: SH is sodium hydrosulfite; iAA is iso-ascorbic acid.

TABLE 7

Reactants and Reagents (grams) for Preparation of Acrylic-Urethane Copolymers

|  | Ex. 15 | Ex. 16 | Ex. 17 | Ex. 18 | Ex. 19 | Ex. 20 |
|---|---|---|---|---|---|---|
| PUD used | Example 6 | Example 7 | Example 7 | Example 7 | Example 8 | Example 9 |
| PUD | 175 | 175 | 325 | 325 | 150 | 177 |
| DI Water | 61.0 | 216.0 | 70.0 | 70.0 | 35.2 | 88.0 |
| BA | 5.9 | 18.6 | 16.6 | 16.6 | — | — |
| BMA | — | — | — | — | 12.6 | 12.3 |
| MMA | — | 9.7 | — | — | — | — |
| EHA | — | — | — | — | — | 2.7 |
| Monomer Feed | (45 mins) | (60 mins) | (60 mins) | (60 mins) | (90 mins) | (45 mins) |
| BA | 17.6 | 55.7 | 29.4 | 29.4 | — | — |
| BMA | 14.7 | — | — | — | 37.9 | 37.0 |
| MMA | — | 55.7 | 29.4 | 29.4 | — | — |
| EHA | — | — | — | — | — | 8.1 |
| Reductant Feed | (75 mins) | (90 mins) | (90 mins) | (90 mins) | (150 mins) | (75 mins) |
| Reductant[1] | 0.29 iAA | 0.34 iAA | 0.54 iAA | 0.27 SSF | 0.79 SH | 0.22 SH |
| DI Water | 15.0 | 27.5 | 37.0 | 37.0 | 37.0 | 16.0 |
| 0.5N NaOH soln Chase | 3.9 | 5.0 | 7.3 | 7.3 | 8.1 | 4.3 |
| tBHP (70%) | 0.17 | 0.20 | 0.32 | 0.16 | — | 0.11 |
| DI Water | 2.0 | 3.5 | 5.0 | 5.0 | — | 2.0 |
| Solids Content, % | 31.1% | 33.8% | 35.9% | 34.5% | 34.7% | 34.3% |

TABLE 7-continued

Reactants and Reagents (grams) for Preparation of Acrylic-Urethane Copolymers

|  | Ex. 15 | Ex. 16 | Ex. 17 | Ex. 18 | Ex. 19 | Ex. 20 |
|---|---|---|---|---|---|---|
| Particle Size (nm) | 55 nm | 65 nm | 124 nm | 127 nm | 125 nm | 88 nm |
| Residual BA (ppm) | 350 ppm | 300 ppm | 135 ppm | 230 ppm | — | — |
| Residual BMA (ppm) | — | — | — | — | 146 ppm | 150 ppm |
| Residual MMA (ppm) | — | 50 ppm | <10 ppm | 250 ppm | — | — |

[1] Reductant: iAA is iso-ascorbic acid; SSF is sodium hydroxymethanesulfinate; SH is sodium hydrosulfite.

TABLE 8

Overview of Acrylic-Urethane Copolymers, Examples 10-14

|  | Example 10 | Example 11 | Example 12 | Example 13* | Example 14 |
|---|---|---|---|---|---|
| PUD used | Example 2 | Example 3 | Example 4 | Example 5 | Example 6 |
| Solvent in PUD | NMP | NMP | NMP | NMP | BMA |
| Monomer in Copolymer | BMA | BMA | BMA | BMA | BMA |
| PU % of Copolymer | 39.75 | 34.6 | 31.5 | 49.2 | 25.0 |
| PA % of Copolymer | 60.25 | 65.4 | 68.5 | 50.8 | 75.0 |
| Reductant[1] Used | SH | SH | SH | SH | iAA |
| Reductant/Disulfide Ratio | 0.32 | 0.25 | 0.19 | — | 0.50 |

*Comparative
[1] Reductant: SH is sodium hydrosulfite; iAA is iso-ascorbic acid.

TABLE 9

Overview of Acrylic-Urethane Copolymers, Examples 15-20

|  | Ex. 15 | Ex. 16 | Ex. 17 | Ex. 18 | Ex. 19 | Ex. 20 |
|---|---|---|---|---|---|---|
| PUD used | Example 6 | Example 7 | Example 7 | Example 7 | Example 8 | Example 9 |
| Solvent in PUD | BMA | MMA | MMA | MMA | DPGDME | DPGDME |
| Monomer in Copolymer | BMA/BA | BA/MMA | BA/MMA | BA/MMA | BMA | EHA/BMA |
| PU % of Copolymer | 50.0 | 25.0 | 50.0 | 50.0 | 50.0 | 50.0 |
| PA % of Copolymer | 50.0 | 75.0 | 50.0 | 50.0 | 50.0 | 50.0 |
| Reductant[1] Used | iAA | iAA | iAA | SSF | SH | SH |
| Reductant/Disulfide Ratio | 0.50 | 0.58 | 0.50 | 0.37 | 0.73 | 0.35 |

[1] Reductant: iAA is iso-ascorbic acid; SSF is sodium hydroxymethanesulfinate; SH is sodium hydrosulfite.

Example 21

Phase Homogeneity of Acrylic-Urethane Copolymers

Figure 1:
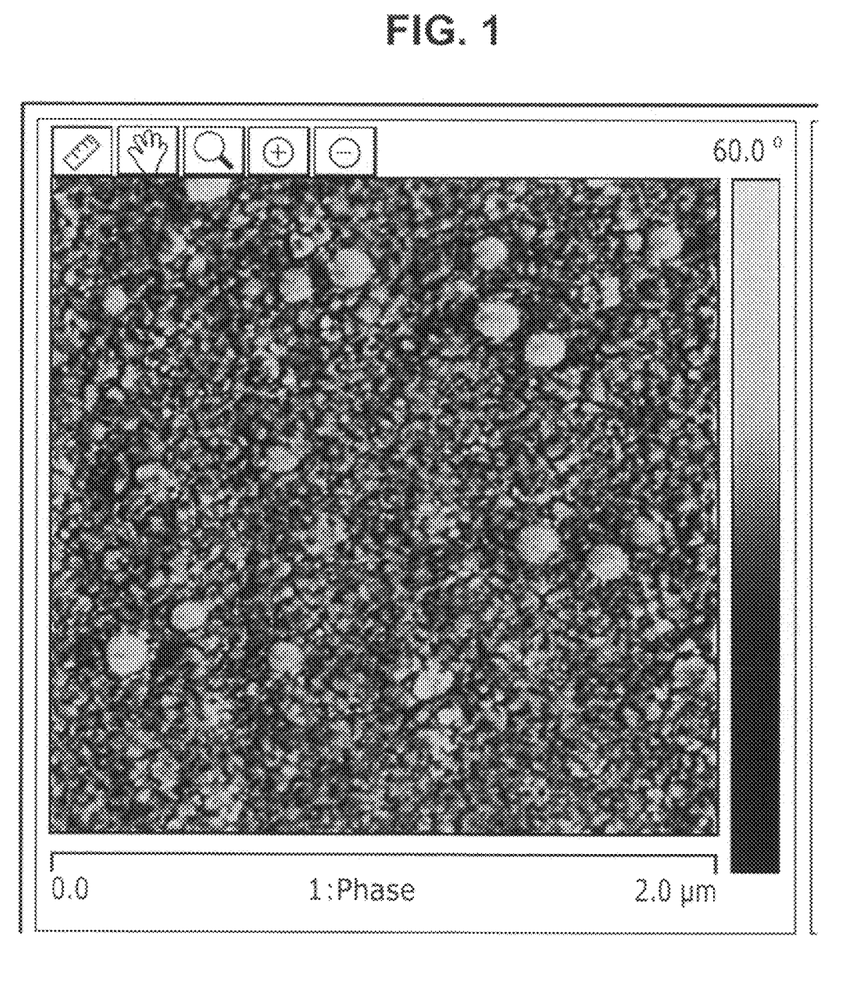
FIG. 1 depicts an Atomic Force Microscopy (AFM) Micrograph (phase mode) of a film formed from a blend of an acrylic emulsion with a polyurethane dispersion.
Figure 2:
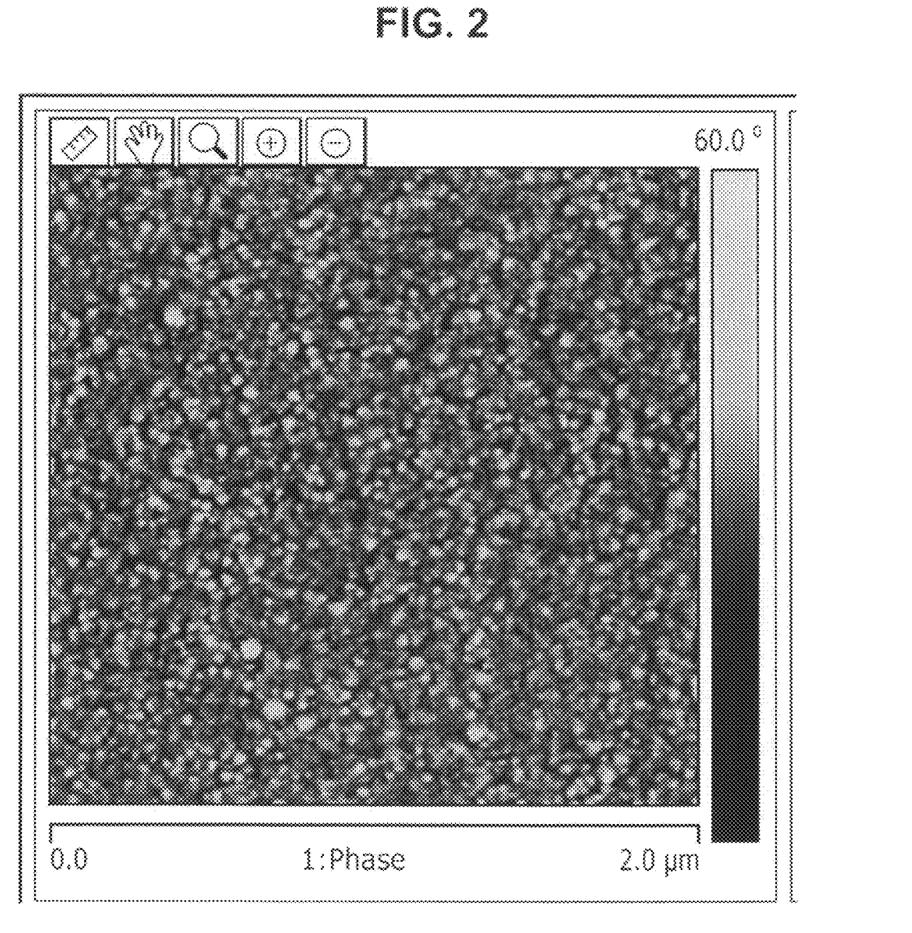
FIG. 2 depicts an Atomic Force Microscopy (AFM) Micrograph (phase mode) of a film formed from a conventional urethane-acrylic hybrid dispersion.
Figure 3:
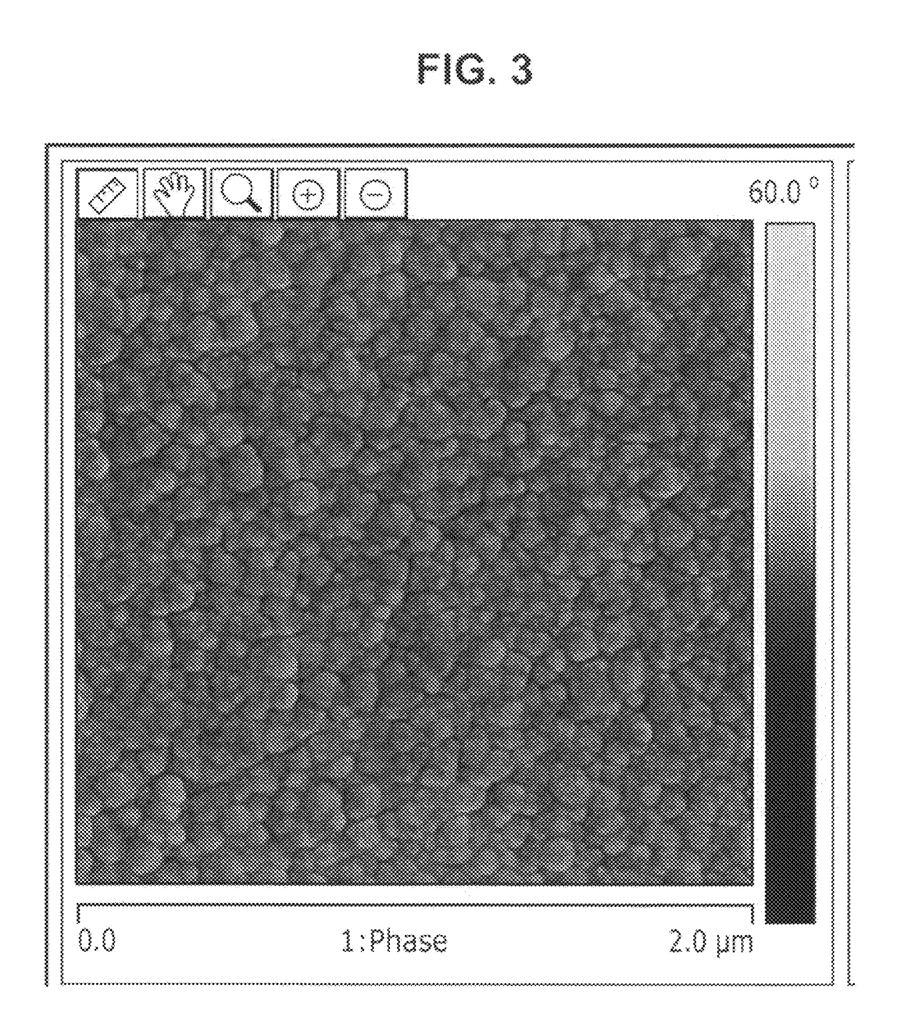
FIG. 3 depicts an Atomic Force Microscopy (AFM) Micrograph (phase mode) of a film formed from the inventive acrylic-urethane block copolymer dispersion.

Atomic Force Microscopy, in tapping mode, (AFM) was employed to assess the extent, if any, of the phase separation resulting from incompatibility of the urethane and acrylic portions of the polymers. The AFM micrographs in FIGS. 1, 2 and 3 are shown in phase mode, which shows differentiation according to regions of different hardness. FIG. 1 depicts an AFM micrograph for a film resulting from a blend of an acrylic emulsion with a polyurethane dispersion, and clearly shows the phase inhomogeneity resulting from the incompatibility of the polyurethane polymer and the acrylic polymer. FIG. 2 depicts an AFM micrograph of a film resulting from a conventional urethane-acrylic hybrid dispersion, and shows that conventional urethane-acrylic hybrid polymers suffer from phase inhomogeneity resulting from the incompatibility of the urethane and acrylic regions of the polymer. On the other hand, FIG. 3, which depicts an AFM micrograph of a film resulting from the inventive acrylic-urethane block copolymer dispersion, shows that the inventive acrylic-urethane copolymers produced via the disulfide/reductant initiated polymerization of the acrylic portion within the urethane polymer chains results in one homogeneous phase. The compatibility of the inventive polymers results from the polymerization of the acrylic monomers occurring within and throughout the polyurethane polymer particle; the latter results in blocks of acrylic polymer interspersed along the polyurethane polymer chains.

Phase incompatibility between acrylic and urethane polymers has long been considered to limit the full potential of combining these classes of polymers. Brown et al. (Progress in Organic Coatings, Vol. 52, (2005), pages 73-84) have shown that urethane-acrylic hybrid polymers have improved mechanical properties compared to simple blends of acrylic polymers with urethane polymers, and attributed the improved performance to increased phase mixing and improved dispersion of phase domains in films resulting from the hybrid polymers. The inventive method presented here goes one step further in the development of urethane-acrylic polymers, by accessing a single phase system where the acrylic and urethane components are completely compatible.

Example 22

Resistance of Acrylic-Urethane Block Copolymer Films to UV Light

The use of conventional PUDs and conventional urethane-acrylic hybrid polymers in outdoor protective coatings has been limited because they are known to fail by cracking upon prolonged outdoor exposure. The time to failure is considerably faster than other types of commonly used polymer compositions, including acrylic polymers. Table 10, below, shows the results of simulated accelerated weathering tests performed by exposure of polymer clear films to UV light. Films of inventive acrylic-urethane block copolymers are compared to films of conventional PUD and urethane-acrylic hybrid polymers.

TABLE 10

Effect of UV Light on Films of Acrylic-Urethane Block Copolymers Compared to Films of Conventional PUD and Urethane-Acrylic Hybrid Polymers.

| Sample [1] | Polymer Type [2] | U/A Ratio [3] | PTMEG [4] | Film Appearance (500 hours QUV) [5] |
|---|---|---|---|---|
| Example 10 | a-u copolymer | 40/60 | 11.8 | clear/colorless |
| Example 11 | a-u copolymer | 35/65 | 6.5 | clear/colorless |
| Example 12 | a-u copolymer | 31.5/68.5 | 2.9 | clear/colorless |
| Example 13 * | u-a hybrid | 50/50 | 19.9 | opaque/yellowing |
| Example 1 * | PUD only | 100/0 | 47 | opaque/sl. yellow |

[1] Example 1 is a Comparative since it has no acrylic polymer component. Example 13 is a Comparative since it is formed using the PUD of Example 5, which PUD does not comprise the disulfide initiating fragment; the polymerization therefore runs as a conventional urethane-acrylic hybrid.
[2] "a-u copolymer" refers to an inventive acrylic-urethane block copolymer; "u-a hybrid" refers to a conventional urethane-acrylic hybrid polymer (comparative).
[3] "U/A Ratio" is the ratio, by weight, of urethane polymer (or polymer segments) to acrylic polymer (or polymer segments).
[4] The weight percent of PTMEG in the overall polymer sample.
[5] The clear film samples were exposed to 500 hours UV radiation in a QUV "B" weatherometer.

The inventive acrylic-urethane block copolymers (Examples 10, 11, and 12) show better resistance to UV light than either the polyurethane polymer (Example 1, PUD only) or the urethane-acrylic hybrid polymer (Example 13).

Example 23

Alternative Synthesis of Acrylic-Urethane Block Copolymers by Mini-Emulsion Polymerization A standard solution of polyurethane in butyl methacrylate was prepared by the following procedure. In a 2000 mL reaction flask, 600.0 g of butyl methacrylate was mixed with 201.5 g of poly(tetramethylene ether) glycol (Mw average 650 g/mol) and 8.0 g of 2-hydroxyethyl disulfide. 0.01 g of TEMPO was added to the flask. 190.5 g of methylene bis(4-cyclohexylisocyanate) was transferred to the flask. Under $N_2$ atmosphere the reaction was stirred and heated at 85° C. for 1 hour. After 1 hour at temperature, 0.1 mL of dibutyltin dilaurate was added to the reaction flask and the reaction was maintained for one additional hour. 85.5 g of 2-butoxyethanol was added to the reaction followed by an additional 0.1 mL of dibutyltin dilaurate and the reaction was maintained for one additional hour. The reaction was cooled to room temperature.

The standard solution of polyurethane in BMA prepared above was mixed as follows. 257.7 g of the standard solution of polyurethane in BMA was combined with 20.0 g of stearyl methacrylate and 107.5 g of monomer X and the mixture was homogenized by mechanical stirring. The monomer mixture was combined with 390 g of water containing 12.8 g of a 30% solution of Disponil FES-32. The mixture was homogenized by mechanical mixing and the resulting emulsion was processed by high pressure homogenization using a Niro Soavi PANKDA 2K homogenizer.

The high pressure homogenized emulsion was transferred to a reaction kettle. The reactants were mixed and heated to 75° C. Once at 75° C., a solution of 1.1 g of sodium hydrosulfite in 50 mL of water was added dropwise over a 1 hour period. After the addition of the sodium hydrosulfite solution, the reaction temperature was maintained for 30 minutes and then 1.1 g of tetrabutyl hydro peroxide solution (70% in water) in 5 mL of water was added to the reaction. The reaction temperature was maintained for 30 minutes and then cooled to room temperature.

The same procedure was performed to make 5 different acrylic-urethane block copolymers, wherein the procedure differed only in the choice of monomer X. For each of 5 preparations (i)-(v), the monomer X in each case was: i) butyl methacrylate; (ii) methyl methacrylate; (iii) ethylhexyl acrylate; (iv) butyl acrylate; and (v) styrene. For each of the five dispersions, the polymer solids was 49.3%+/−0.2%.

We claim:

1. A composition comprising a stable aqueous dispersion of a copolymer containing acrylic polymer blocks and urethane polymer blocks wherein a) each acrylic block and each urethane block are linked to each other through a sulfur atom; b) the dispersion contains from 30% to 85% water by weight of the total dispersion; and c) the dispersion contains a substantial absence of an organic solvent.

2. The composition according to claim 1, wherein the block copolymer contains from 55% to 75% by weight, based on the total weight of the block copolymer, of acrylic blocks.

3. The composition according to claim 1, wherein the block copolymer contains from 65% to 75%, by weight based on the total weight of the block copolymer, of acrylic blocks.

4. The composition of claim 1 wherein the dispersion contains from 40% to 60% water by weight of the total dispersion and no organic solvent.

5. A method comprising the steps of:
a) dispersing into water
   i) a polyurethane prepolymer containing in-chain disulfide groups; and
   ii) a dispersant;
   under conditions suitable to form a stable aqueous dispersion of the prepolymer; and
b) contacting the dispersion of the prepolymer from step (a) with an ethylenically unsaturated acrylic monomer and a reducing agent selected from the group consisting of: isoascorbic acid, malic acid, lactic acid, alkali metal sulfites, alkali metal bisulfites, alkali metal hydrosulfites, alkali metal hyposulfites, alkali metal metabisulfites, sodium formaldehyde sulfoxylate, N,N-dimethyl-p-toluidine, and combinations thereof to form a stable aqueous dispersion of a copolymer containing acrylic polymer blocks and urethane polymer blocks, wherein each acrylic block and each urethane block are linked to each other through a sulfur atom.

6. The method of claim 5, wherein the in-chain disulfide groups are —($OCH_2CH_2S$—$SCH_2CH_2O$)—.groups.

7. The method of claim 5 which further includes the step of applying the composition to a surface to form a coating on the surface.

* * * * *